Oct. 19, 1965 R. J. LOYD 3,212,322
CHROMATOGRAPHIC SEPARATION PROCESS AND APPARATUS THEREFOR
Filed Dec. 19, 1960

INVENTOR.
R. J. LOYD
BY *Hudson & Young*
ATTORNEYS

United States Patent Office 3,212,322
Patented Oct. 19, 1965

3,212,322
CHROMATOGRAPHIC SEPARATION PROCESS
AND APPARATUS THEREFOR
Robert J. Loyd, Bartlesville, Okla., assignor to Phillips
Petroleum Company, a corporation of Delaware
Filed Dec. 19, 1960, Ser. No. 76,895
7 Claims. (Cl. 73—23.1)

This invention relates to an improved method of and apparatus for analyzing paraffinic hydrocarbons. In one specific aspect, this invention relates to an improved method of and apparatus for analyzing light saturated paraffinic hydrocarbons.

A method of measuring the concentration of constituents of a fluid stream involves the use of a chromatographic analyzer. In chromatography, the vapor sample material to be analyzed is introduced into a column containing a selective sorbent or partitioning material. A carrier gas is directed into the column so as to force the sample material therethrough. The selective sorbent, or partitioning material, attempts to hold the constituents of the mixture. This results in several constituents of the fluid mixture flowing through the column at different rates of speed, depending upon their affinities for the packing material. The column effluent thus consists initially of the carrier gas alone, the individual constituents of the fluid mixture appearing later at spaced timed intervals. A conventional method of detecting the presence and concentration of these constituents is to employ a thermal conductivity detector which compares the thermal conducivity of the effluent gas with the thermal conductivity of the carrier gas directed to the column.

The efficiency of the chromatographic column employing a conventional partitioning liquid is proportional to and measured by the resolution between constituents of the column feed effected by the column. The resolution between constituents produced by a chromatographic column can be expressed by the following equation:

$$R_{ij} = (\alpha_{ij} - 1)\left(\frac{K_i}{1+K_i}\right)\frac{N^{1/2}}{4}$$

where $R_{ij}$ is the resolution between components $i$ and $j$; $\alpha_{ij}$ is the relative solubility of consecutive components $i$ and $j$; $K_i$ is the ratio of the capacity of the liquid phase to the capacity of the gas phase; and N is the number of theoretical plates of the column. In the case of light saturated paraffinic hydrocarbons, resolution between components suffers because of low plate capacity. For example, in the case of a methane-ethane separation, $K_i$ is usually of the order of 0.1. Therefore, no matter how many theoretical plates or how different the relative solubilities, the resolution of the two is difficult. The optimum value of $K_i$ is in the order of 2.0–3.0.

Accordingly, an object of this invention is to provide an improved method of and apparatus for the analysis of paraffinic hydrocarbon fluid streams.

Another object of this invention is to provide an improved method of and apparatus for the analysis of light saturated paraffinic hydrocarbons.

Other objects, advantages and features of my invention will be readily apparent to those skilled in the art from the following description and the appended claims.

Broadly, I have discovered that improved resolution is obtained in the analysis of light saturated paraffinic hydrocarbons by employing a straight chain saturated hydrocarbon as a partitioning liquid in a chromatographic column.

Figure 1:
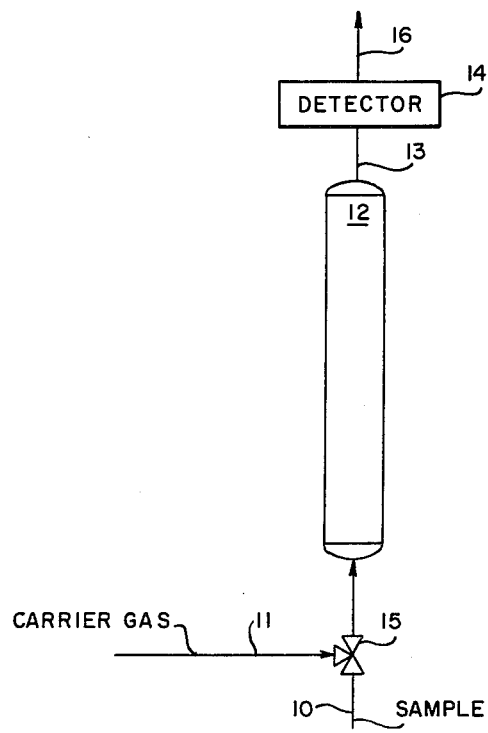
FIGURE 1 is a schematic representation of the analyzing equipment employed.

Referring to FIGURE 1, there is shown a column 12 which contains a partitioning liquid on an inert support material such as Chromosorb, a fire brick material manufactured by Johns-Manville for use in chromatographic analyzers. The partitioning liquid employed is selected from the group of straight chain saturated hydrocarbons ranging from octadecane to octacosane. The concentration of partitioning liquid on the inert support material is preferably in the range from 5.0–15.0 weight percent.

A vaporous fluid sample to be analyzed is introduced to the inlet of column 12 by means of a conduit 10 and a three-way control valve 15. This method of analysis is applicable to saturated paraffinic hydrocarbons having from one to eight carbon atoms per molecule and is particularly applicable to light saturated paraffinic hydrocarbons having from one to four carbon atoms per molecule, as hereinafter demonstrated. A carrier gas such as helium is introduced into column 12 by means of a conduit 11 and three-way valve 15. The effluent from column 12 passes by means of a conduit 13 to the inlet of a detector 14.

Detector 14 is adapted to measure a property of the fluid mixture directed thereto, which property is representative of the composition of the fluid mixture. The detector can advantageously comprise a thermal conductivity analyzer which includes a temperature-sensitive resistance element disposed in the effluent gas flow. A reference element, not shown, can be disposed in the carrier gas flow to three-way valve 15. Such a detector provides signals representative of the difference in thermal conductivity between the column effluent and the carrier gas. The temperature differences between the resistance elements can be measured by electrical bridge circuits, such as a Wheatstone bridge. However, the detector can also be any other type of apparatus known in the art for measuring a property of the gaseous stream.

The three-way valve 15 can be operated by a timer, not herein shown. Such a timer provides output signals that operate a valve in a desired sequence. This timer can be any type of apparatus known in the art for providing control signals in desired sequence. One common type of timer which can be employed to advantage utilizes a series of cam operated switches wherein the associated cams are rotated by a timing motor.

Advantages and features of the inventive method of analysis are readily apparent when reference is made to the following specific analysis of a hydrocarbon mixture.

EXAMPLE I

Column 12 was formed of two feet of ⅛-inch stainless steel tubing containing a partitioning liquid upon 100–140 mesh Chromosorb as an inert packing support. The partitioning liquid employed was octadecane. The concentration of octadecane on the Chromosorb was 10 percent based upon the weight of the Chromosorb. Hydrogen was employed as a carrier gas and was supplied by conduit 11 at the rate of 125 cc./min. The volume of the sample mixture analyzed was 0.05 cc. The sample mixture was of the following composition with the listed $K_i$ and $\alpha_{ij}$ values.

Table I

|  | $K_i$ | $\alpha_{ij}$ | Volume Percent |
|---|---|---|---|
| Methane | 0.02 |  | 10.9 |
| Ethane | 0.24 | 12 | 18.3 |
| Propane | 0.77 | 3.21 | 27.7 |
| Isobutane | 1.65 | 2.14 | 10.2 |
| N-Butane | 2.43 | 1.47 | 32.9 |

The sample was passed as a vapor to column 12 at a temperature of 50° C.

The above $K_i$ values for the listed constituents was obtained by first passing a known quantity of air through the column and then passing the same quantity of methane as a pure vaporous constituent through the column. The operation was repeated for ethane, propane, isobutane and n-butane. The following equation was employed to determine the respective $K_i$ values:

$$T_i = (1 + K_i) T_a$$

where $T_i$ is the time required for the pure component to pass from the column and $T_a$ is the time required for the same quantity of air to pass from the column.

Figure 2:
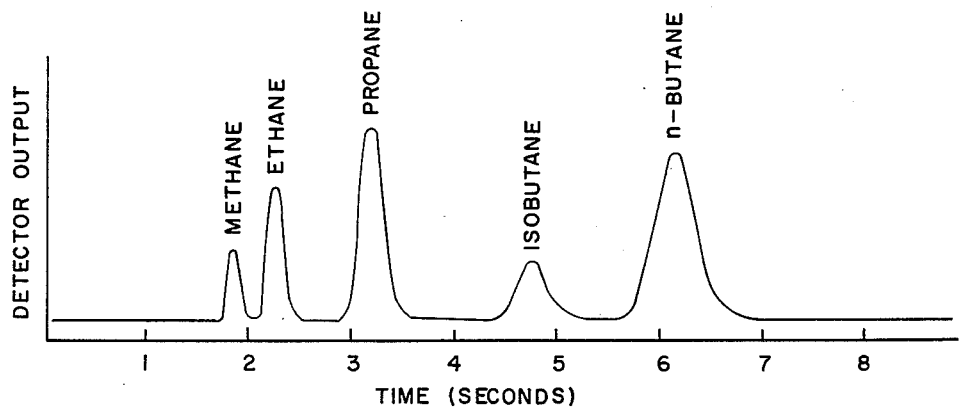
FIGURE 2 is a graphical representation of an operating feature of the analyzer of FIGURE 1.

The results are illustrated in FIGURE 2. It is noted that resolution improves with increasing $K_i$ and increasing $\alpha_{ij}$. Excellent resolution has been obtained between the constituents of the sample mixture due to the high plate capacity of the partitioning liquid.

EXAMPLE II

Conventional partitioning liquids do not have as high a plate capacity for the constituents of the sample mixture at this temperature. In order to demonstrate the effectiveness of the invention method of analysis, a comparison was made with a conventional chromatographic analysis method employing squalane as a partitioning liquid. The $K_i$ and $\alpha_{ij}$ values were determined for a column containing 10 percent by weight of squalane as a partitioning liquid in the same manner as in Example I. The $K_i$ and $\alpha_{ij}$ values for a column containing octadecane as a partitioning liquid are repeated for purposes of comparison. The results are illustrated in Table II.

Table II

|  | Octadecane | | Squalane | |
|---|---|---|---|---|
|  | $K_i$ | $\alpha_{ij}$ | $K_i$ | $\alpha_{ij}$ |
| Methane | 0.02 |  | 0.004 |  |
| Ethane | 0.24 | 12 | 0.137 | 19.42 |
| Propane | 0.77 | 3.21 | 0.414 | 2.78 |
| Isobutane | 1.65 | 2.14 | 0.864 | 2.09 |
| N-Butane | 2.43 | 1.47 | 1.283 | 1.43 |

The $K_i$ values for the octadecane partitioning liquid are substantially higher than for squalane as a partitioning liquid. FIGURE 2 demonstrates that improved resolution is a net result of increasing the value of $K_i$. It can be readily seen by referring to the equation for the resolution value of the column, that the $\alpha$ values for octadecane and squalane are not significantly different. Therefore, a substantial increase in efficiency in the analysis of paraffinic hydrocarbons is a result of employing the inventive method.

As will be evident to those skilled in the art, various modifications of this invention can be made or followed, in the light of the foregoing disclosure and discussion without departing from the spirit or scope thereof.

I claim:

1. A method of analyzing a mixture of saturated paraffinic hydrocarbons having from 1 to 8 carbon atoms per molecule, which comprises introducing said hydrocarbon mixture as a vapor into the inlet of a zone containing a partitioning liquid on an inert support, said partitioning liquid consisting of a liquid selected from the group of straight chain saturated hydrocarbons in the range of octadecane to octacosane, introducing a carrier gas into the inlet of said zone, whereby said liquid selectively retards the passage of said hydrocarbon mixture through said zone, and measuring a property of the effluent from said zone which is representative of the composition thereof.

2. The method of claim 1 wherein the concentration of said partitioning liquid on said inert support is in the range of 5 to 15 percent based upon the weight of said inert support.

3. The method of claim 1 wherein said hydrocarbon mixture consists of paraffinic hydrocarbons having from 1 to 4 carbon atoms per molecule.

4. The method of claim 3 wherein said partitioning liquid is octadecane.

5. Apparatus comprising a column, said column containing a packing material that selectively retards the passage therethrough of the constituents of a vaporous paraffinic hydrocarbon mixture, said packing material consisting of a partitioning liquid selected from a group of straight chain saturated hydrocarbons in the range of octadecane to octacosane on an inert support, a first conduit means communicating with the inlet of said column at one end of said packing material, means of measuring a property of the effluent from said first column which is representative of the composition thereof and a second conduit means communicating between said column at the opposite end of said packing material and said means of measuring a property of the effluent from said column which is representative of the composition thereof.

6. The apparatus of claim 5 wherein the concentration of the said partitioning liquid is in the range of 5 to 15 percent based upon the weight of said inert support.

7. The apparatus of claim 5 wherein said partitioning liquid is octadecane.

References Cited by the Examiner

UNITED STATES PATENTS 2,868,011   1/59   Coggeshal.
2,869,672   1/59   Findlay.
3,074,881   1/63   Jones _____ 55—67 X

OTHER REFERENCES

G. A. Hill and C. Kelley: "Organic Chemistry," Blakiston Co., Philadelphia, 1943, p. 93.

White, D., and Cowan, C. T.: The Sorption Properties of Dimethyldioctadecyl Ammonium Bentonite Using Gas Chromatography. In Trans. Faraday Soc. 54(4); pages 557–561 (1958).

Meigh, D. F.: Nature of the Olefins Produced by Apples, in Nature. 184 (p. 1072) (1959).

Grant, D. W., and Vaughan, G. A.: Relative Retentions of Aliphatic Hydrocarbons, in Journal of Chromatography: li p. XXV (1958).

REUBEN FRIEDMAN, *Primary Examiner.*

WALTER BERLOWITZ, HERBERT L. MARTIN,
*Examiners.*